(12) United States Patent
Robinson (10) Patent No.: US 8,103,556 B2
(45) Date of Patent: Jan. 24, 2012

(54) APPARATUS AND METHOD FOR SELLING GREENHOUSE GAS EMISSION REDUCTION CREDITS

(75) Inventor: Stephen M. Robinson, Spring, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 208 days.

(21) Appl. No.: 12/339,848

(22) Filed: Dec. 19, 2008

(65) Prior Publication Data
US 2010/0161455 A1    Jun. 24, 2010

(51) Int. Cl.
*G06Q 30/00* (2006.01)
*G06Q 40/00* (2006.01)

(52) U.S. Cl. .............................. 705/26.7; 705/37; 705/30

(58) Field of Classification Search ............ 705/26, 705/27, 37, 14.38, 26.7, 30, 36 R, 1.1, 26.1, 705/26.4, 26.41, 28, 29, 34, 35, 39, 27.1, 705/27.2
See application file for complete search history.

(56) References Cited

U.S. PATENT DOCUMENTS

| | | | |
|---|---|---|---|
| 6,115,672 A | 9/2000 | Caveny et al. | |
| 7,092,898 B1 | 8/2006 | Mattick et al. | |
| 2002/0143693 A1 | 10/2002 | Soestbergen et al. | |
| 2003/0075600 A1* | 4/2003 | Struthers et al. | 235/381 |
| 2003/0191707 A1 | 10/2003 | Shepherd | |
| 2003/0229572 A1 | 12/2003 | Raines et al. | |
| 2004/0039684 A1 | 2/2004 | Sandor | |
| 2004/0088179 A1 | 5/2004 | Cogen et al. | |
| 2004/0143467 A1 | 7/2004 | McAllister et al. | |
| 2004/0210478 A1 | 10/2004 | Pettigrew et al. | |
| 2004/0215545 A1 | 10/2004 | Murakami et al. | |
| 2004/0230443 A1 | 11/2004 | McMorris et al. | |
| 2004/0249732 A1 | 12/2004 | Drummond | |
| 2005/0154669 A1 | 7/2005 | Streetman | |
| 2005/0273358 A1 | 12/2005 | Zimmerman | |
| 2005/0283428 A1 | 12/2005 | Bartels et al. | |
| 2006/0085152 A1 | 4/2006 | Sugiyama et al. | |
| 2006/0089851 A1 | 4/2006 | Silby et al. | |
| 2006/0161450 A1 | 7/2006 | Carey et al. | |
| 2006/0184445 A1 | 8/2006 | Sandor et al. | |
| 2006/0224410 A1 | 10/2006 | Kimoto et al. | |
| 2007/0016511 A1 | 1/2007 | Walsh et al. | |
| 2007/0192221 A1 | 8/2007 | Sandor et al. | |

(Continued)

OTHER PUBLICATIONS

New Approach Needed to Pump Up Carbon Offset Sales, Says Study, (Mar. 13, 2007), http://www.pr-inside.com/new-approach-needed-to-pump-up-r64403.htm.

(Continued)

*Primary Examiner* — Igor Borissov
(74) *Attorney, Agent, or Firm* — Jones Day; Christopher D. Northcutt (57) ABSTRACT

The instant invention pertains to an apparatus and method to offset greenhouse gas emissions by offering to sell and/or selling emission reduction credits. The apparatus and method may be employed during a consumer transaction for the transfer of fuel. The apparatus and method may be used at the point of sale of a fuel transaction at a fuel dispenser, such as at a fuel pump. An offer to purchase credits is made to a customer at the fuel dispenser. A response is received from the customer, which is followed by the prompting for more information from the customer along with assistance given to the customer to determine the amount of credits to purchase. The purchase is made at the completion of the transaction. If the offer is rejected, credits are not purchased.

17 Claims, 10 Drawing Sheets

U.S. PATENT DOCUMENTS

2007/0203722 A1  8/2007  Richards et al.
2007/0265897 A1  11/2007  McMorris et al.

OTHER PUBLICATIONS

Carbon Neutrol Petrol Station, (Jun. 5, 2007), http://www.halfbakery.com/idea/Carbon_20neutral_20petrol_20station.

Retail Carbon Credits for the Car Driver, (Nov. 1, 2005), http://ideas.4brad.com/node/287.

Styles, "Energy Outlook" (Jun. 30, 2005), http://energyoutlook.blogspot.com/2005_06_01_archive.html.

Makower, "Climate Neutral Driving Gets in Gear," (Jun. 3, 2005), http://makower.typepad.com/joel_makower/2005/06/climate_neutral.html.

* cited by examiner

| | |
|---|---|
| WOULD YOU LIKE TO HELP REDUCE GREENHOUSE GASES BY PURCHASING AN EMISSION CREDIT TODAY?<br>• YES<br>• NO<br>• MAYBE, TELL ME MORE | WHAT TYPE OF FUEL DO YOU MOST REGULARLY USE IN YOUR VEHICLE?<br>• UNLEADED GASOLINE<br>• DIESEL |
| HOW MANY MILES PER GALLON DOES YOUR VEHICLE AVERAGE?<br>• LESS THAN 15<br>• 15 TO 20<br>• 20 TO 25<br>• GREATER THAN 25 | HOW MANY TOTAL MILES DOES YOUR VEHICLE AVERAGE IN A YEAR?<br>• LESS THAN 9,000<br>• 9,000 TO 12,000<br>• 12,001 TO 15,000<br>• GREATER THAN 15,000 |

FIG. 3A

| | |
|---|---|
| WHAT TYPE OF VEHICLE DO YOU HAVE? | • HEAVY TRUCK<br>• LIGHT TRUCK<br>• FULL-SIZE CAR<br>• COMPACT CAR |

| | |
|---|---|
| THE AMOUNT OF GREENHOUSE GASES THAT WILL BE RELEASED FROM YOUR FUEL PURCHASE TODAY IS:<br><br>XX.XX POUNDS OF CARBON DIOXIDE | • CONTINUE |

| | |
|---|---|
| THE ESTIMATED AMOUNT OF GREENHOUSE GASES THAT WILL BE RELEASED BY YOUR VEHICLE ANNUALLY IS:<br><br>XX.XX TONS OF CARBON DIOXIDE | • CONTINUE |

| | |
|---|---|
| TO OFFSET THE EMISSIONS FROM YOUR FUEL PURCHASE TODAY, WE SUGGEST YOU PURCHASE EMISSION CREDITS IN THE AMOUNT OF:<br><br>$ XX.XX | • YES, I WANT TO PURCHASE<br>• NO, I DO NOT WANT TO PURCHASE<br>• I WANT TO ENTER A DIFFERENT AMOUNT |

APPARATUS AND METHOD FOR SELLING GREENHOUSE GAS EMISSION REDUCTION CREDITS

FIELD OF THE INVENTION

Provided herein is an apparatus and method for effectively and efficiently offering to sell and/or selling greenhouse gas emission reduction credits at, for example, the point of sale for a fuel purchase.

BACKGROUND OF THE INVENTION

The world today is in many ways dependent on fuels, or substances that are burned or otherwise modified to produce energy. At the same time, industry, government, and consumers are becoming increasingly aware and concerned about the environment. One concern in particular is that the use of certain fuels emits greenhouse gases into the atmosphere, potentially leading to climate change or global warming. Specifically, many believe that increasing levels of these emissions may cause the atmosphere to absorb more of the energy radiated from the earth's surface and thereby negatively influence the climate over the long term. The six primary anthropogenic greenhouse gases, as covered under the Kyoto Protocol to the United Nations Framework Convention on Climate Change, or "Kyoto Protocol" as used herein, are carbon dioxide, methane, nitrous oxide, sulfur hexafluoride, hydrofluorocarbons, and perfluorocarbons.

Consumers concerned with the environment and the potential for climate change have long sought ways to reduce the potential environmental impact due to their own consumption of fuel and corresponding emissions. That is, environmentally conscious consumers may seek to reduce or eliminate their own emission footprints. These consumers have tried a variety of lifestyle changes such as driving more fuel-efficient vehicles, switching to alternatively-powered vehicles such as hybrid vehicles, taking public transportation, and/or reducing the use of fuel in their homes. While these lifestyle changes may be effective to some extent, consumers and businesses alike are increasingly engaging in additional methods of reducing emissions around the world. One such method is the purchase of emission reduction credits to offset the emission of greenhouse gases.

An "emission offset," "offset," or "carbon offset" is generally a financial investment in a project directed at reducing greenhouse gas emissions. An offset unit, i.e., one offset, is typically directly proportional to some amount of reduction or avoidance—either direct or indirect—of greenhouse gases. As used herein, an "emission reduction credit," "credit," or "carbon credit" refers to a financial instrument used to subsidize a certain quantity of emission reduction or avoidance through such offsets. For example, one carbon credit may represent the reduction of one metric ton of carbon dioxide or its equivalent in other greenhouse gases. Currently there is no uniform standard for certifying emission offset projects and issuing credits. A few evolving voluntary standards include those set by Green-e, as embodied in the *Green-e Energy National Standard* version 1.5, modified Apr. 3, 2008; Environmental Resources Trust, as embodied in *Environmental Resources Trust Uniform National Standard for EcoPower Renewable Energy Certificates*, dated June 2006; the Voluntary Carbon Standard, as embodied in *Voluntary Carbon Standard* 2007, released Nov. 19, 2007; the Gold Standard, as embodied in *Gold Standard Requirements* 2.0, dated Aug. 1, 2008; and the Climate, Community and Biodiversity Alliance, as embodied in *Climate, Community and Biodiversity Project Design Standards (First Edition)*, dated October 2005. Flexible mechanisms for the worldwide purchase, sale, and exchange of emission reduction credits were set forth in the Kyoto Protocol. The present invention is not limited to any particular standard; any suitable standard may be employed or devised.

Opportunities to offset emissions exist by means of projects around the world that reduce or avoid greenhouse gas emissions in some manner. For example, a project seeking to produce clean energy from renewable sources is assumed to displace an equivalent amount of conventionally produced electricity, thus avoiding the corresponding amount of emissions. Offsets include projects for renewable energy (e.g., wind, solar, hydroelectric, biofuel, or other sources of renewable energy), methane abatement (e.g., combustion or containment of methane generated by farm animals, landfills, or industrial waste), energy efficiency (e.g., electricity/heat cogeneration, fuel efficiency or energy efficiency projects), destruction of pollutants (e.g., hydrofluorocarbons, perfluorocarbons, and nitrous oxide destruction), reforestation or other change in land use (e.g., avoided deforestation, afforestation or soil management), geothermal power (e.g., hot dry rock), and fuel switching (e.g., replacement of high-sulphur fuels with low-sulphur alternatives). The projects described above are typically verified by a qualified third party in accordance with an applicable standard. After verification, credits may be issued by the project developer or by an applicable governing body such as the United Nations Framework Convention on Climate Change, and listed in a registry and/or a database for trade.

For consumers, avenues to purchase emission reduction credits are somewhat limited. Some more environmentally-conscious consumers are able to purchase credits through the Internet, from retail vendors, or from entities engaged in the trade of credits. Many other consumers are interested in reducing their own emission footprints as well as emissions around the world, but are largely unaware of the avenues available for them to do so.

SUMMARY OF THE INVENTION

The instant invention provides a new apparatus and method for use by consumers in effectively and efficiently reducing or avoiding greenhouse gas emissions from the use of fuels. The methods and systems can be used advantageously in combination with lifestyle changes such as the aforementioned ones. The inventive apparatus and method do not, however, require said lifestyle changes if they are not desirable to the consumer.

In one embodiment, the invention pertains to an apparatus for selling greenhouse gas emission reduction credits. The system comprises a fuel dispenser and a control system. The fuel dispenser comprises a user interface capable of (a) displaying an offer to purchase emission reduction credits to a customer; (b) receiving the customer's response; and (c) transmitting the response in the form of a communication signal. The control system is operably connected to the fuel dispenser such that the control system is capable of receiving the communication signal and, based on the customer's response, effectuating a purchase of emission reduction credits or terminating the offer.

In another embodiment, the invention pertains to a method of selling emission reduction credits during a consumer transaction for the transfer of fuel. The method comprises first offering to sell credits to a customer at a fuel dispenser. Next, the customer's response is received at the fuel dispenser. The transaction is then completed based on the response received from the customer at the fuel dispenser.

DETAILED DESCRIPTION OF THE INVENTION

The instant method involves the reduction of greenhouse gas emissions via the sale and purchase of emission reduction credits during a consumer transaction for the transfer of fuel, or a fuel transaction, at a fuel dispenser. There are currently a number of different markets for the purchase and trading of credits such as the European Union Emission Trading Scheme and the voluntary Chicago Climate Exchange. The present invention is not limited to any particular market or trading scheme. Thus, the invention is broadly applicable so long as the owner or operator of the fuel dispenser has the ability to offer credits (whether the credits are traded on an open market, a private market, or are simply associated with the owner or operator of the fuel dispenser) for purchase at the fuel dispenser. The offered credits may be purchased by the owner or operator of the fuel dispenser or associated entity for resale prior to, simultaneously with, or after the offer being made to the customer. That is, the credits offered for purchase may, for example, already be owned in a pool of credits associated with the owner or operator of the fuel dispenser. Alternatively, the credits offered for purchase may be acquired or produced by the owner or operator of the fuel dispenser simultaneously with or subsequent to the customer electing to purchase the credits. In yet another embodiment, the offered credits may be associated directly with a producer of emission reduction credits. For example, the credits may be bought directly from a party unrelated to the owner or operator of the fuel dispenser that is simply serving as an intermediary. Credits that are offered for purchase may also exist in a form not limited to a financial instrument. For example, a credit for sale may take on the form of an environmentally-friendly bumper sticker, pin, or t-shirt, where some or all of the proceeds from the sale correspond to an amount of emission offsets.

The emission reduction credits may be offered for sale to a customer at a predetermined price. A predetermined price means that the price for a particular credit unit, fraction, or multiple thereof is set by the owner or operator of the fuel dispenser or other credit vendor prior to the offer being made to a customer. In some cases, only the unit price of each credit is predetermined. Consequently, the total price of the sale of credits may vary from one customer to another, depending on the volume of units the customer purchases, which may correlate to the amount of fuel that is transferred in the transaction. Alternatively, the entire sale of credits may be at a predetermined, or fixed, price, regardless of the amount of fuel that is transferred.

In the invention, the offer to purchase credits during a fuel transaction occurs at a fuel dispenser prior to, during, or after the transfer of fuel. The type of fuel dispenser is not particularly critical so long as the customer can be offered an option to purchase credits. Examples of fuel dispensers include stationary fuel pumps intended for vehicles, such as pumps at gas stations, boat docks, and airports; and mobile fuel delivery mechanisms, such as on delivery trucks for heating oil, aviation jet fuel, and compressed liquid natural gas. Fuel transaction means a consumer transaction for the transfer of fuel-for example, the purchase of fuel such as gasoline, diesel, marine, or jet fuel.

Figure 1A:
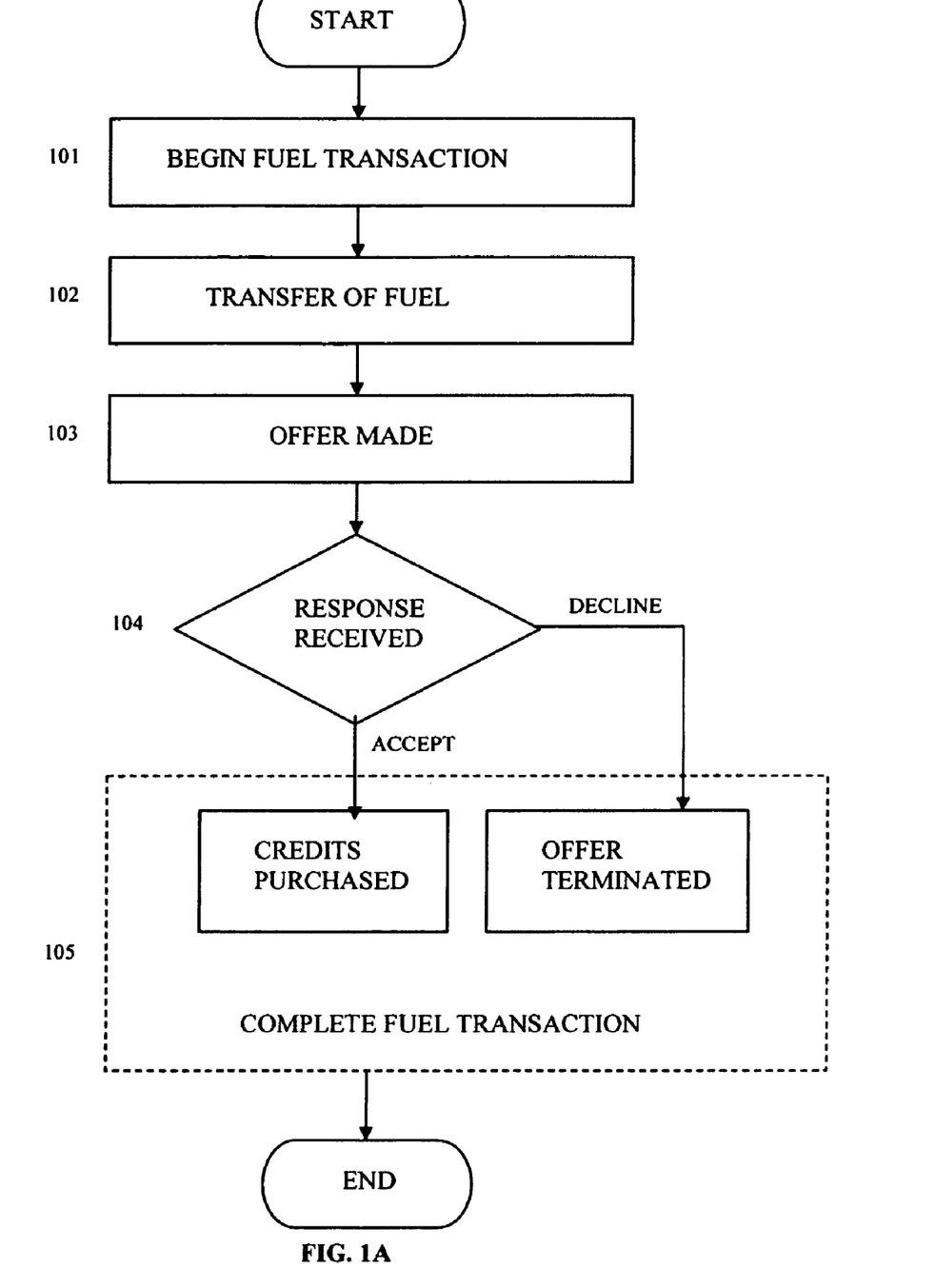
FIGS. 1A, 1B, and 1C contain flow diagrams illustrating the steps of selling emission reduction credits at a fuel dispenser after, before, and during the transfer of fuel, respectively.
Figure 1B:
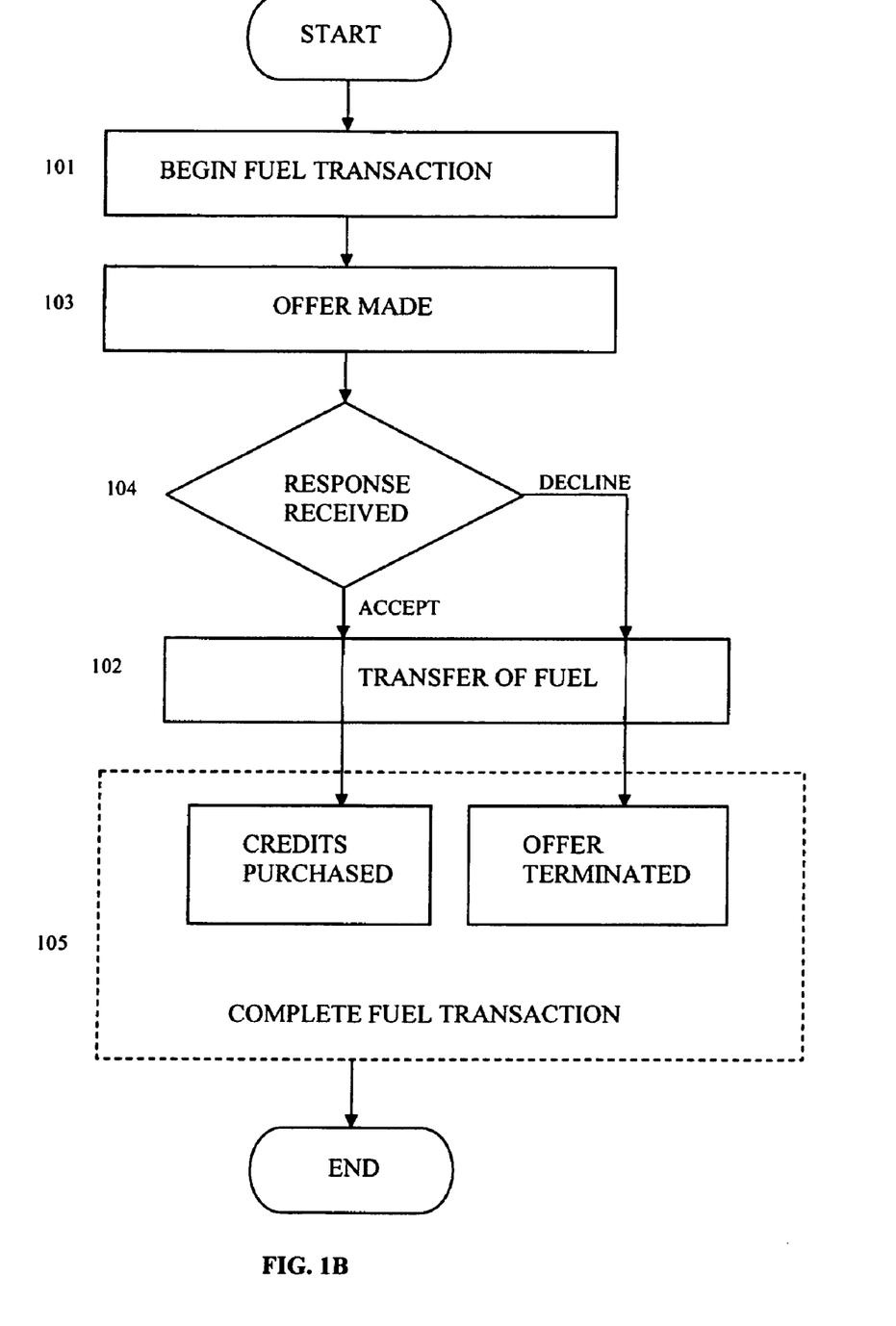
Figure 1C:
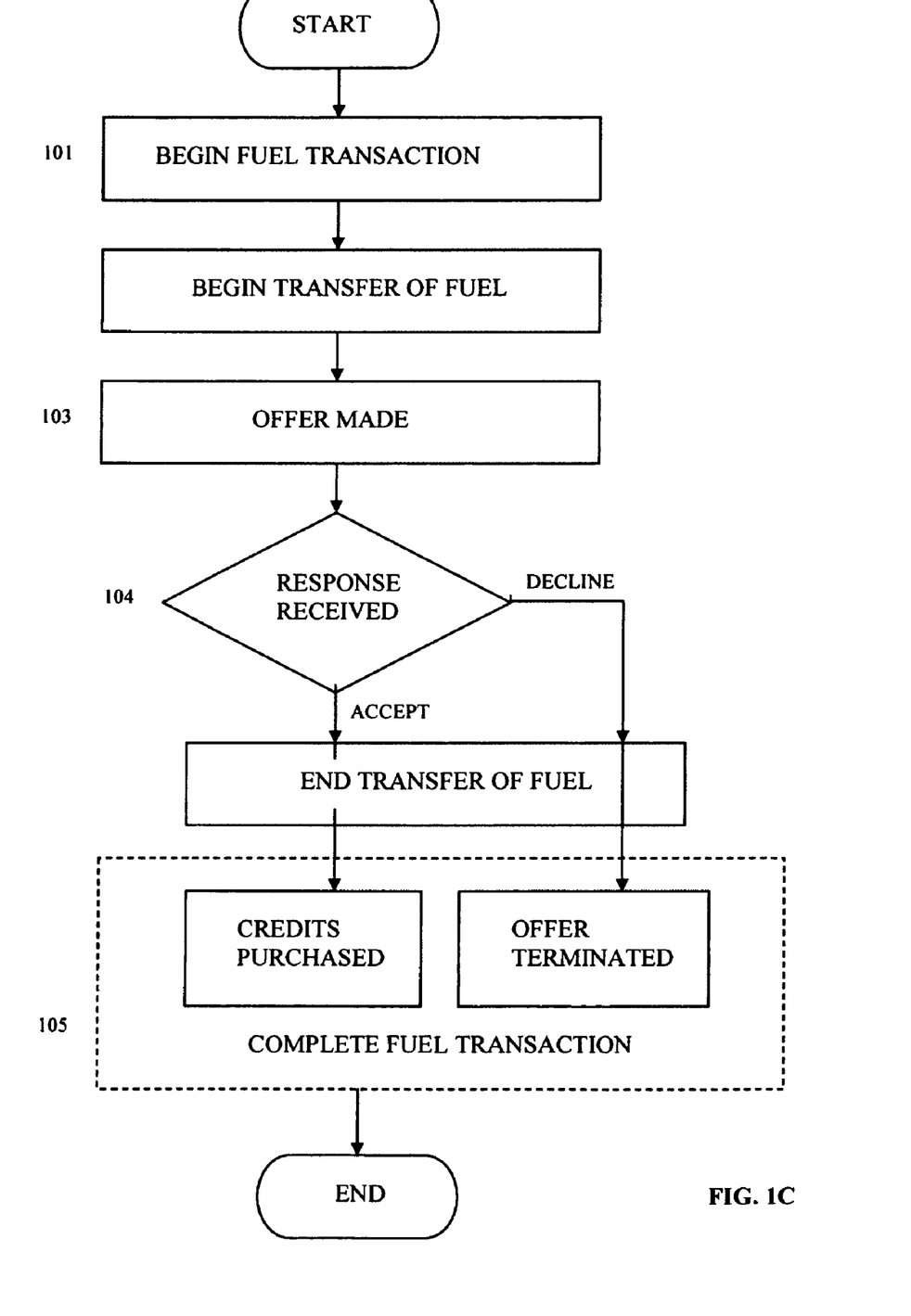

FIG. 1A is a flow diagram illustrating the steps of selling emission reduction credits at a fuel dispenser after the transfer of fuel. In step 101, a fuel transaction with the customer is begun. Depending on the embodiment of the invention, this can be the reading of a customer's credit card at the fuel dispenser, selecting the type of fuel to transfer, or some other event. In step 102, the fuel is transferred to the customer. In step 103, an offer to purchase emission reduction credits is made to the customer. Step 104 represents the receipt of a response from the customer. The response may take the form of a general acceptance to the offer to purchase credits, such as "yes" or "no." It may also be a more specific acceptance, perhaps indicating an assent to purchase a desired amount of credits. In many cases the fuel dispenser is configured to receive the customer's response to the offer at the fuel dispenser. For example, if a customer is buying gasoline or diesel fuel at a gas station, the user interface at the fuel pump may receive the response to the offer from the customer. Step 105 illustrates the step of completing the fuel transaction. Depending on the embodiment of the invention, this step can encompass the purchase of additional products or services, final rendering of payment, and/or other events. If the customer's response comprises an acceptance of the offer, then step 105 of completing the transaction may further comprise effectuating the customer's purchase of credits. If the customer's response further comprises a desired amount of credits to purchase, then step 105 of completing the transaction may further comprise effectuating the customer's purchase of the desired amount of credits. It may also be advantageous that the amount of credits purchased be recorded in a computer system, on a tangible medium such as a receipt, or in another form. On the other hand, if the customer's response declines the offer, then step 105 of completing the transaction may further comprise terminating the offer to purchase emission reduction credits. As shown in FIG. 1B, in another embodiment, step 103 of the offer being made and step 104 of the response being received may, instead, occur prior to step 102 of the transfer of fuel. FIG. 1C depicts yet another embodiment where step 103 of the offer being made and step 104 of the response being received occur during the transfer of fuel, that is, after the transfer of fuel begins but before it ends.

In one embodiment of the invention, the customer is assisted in making his/her response to the offer to purchase emission reduction credits. This assistance can educate the customer so that the customer may make an informed decision on whether to purchase the credits. For example, assistance may be given to the customer by informing the customer of his/her immediate emission footprint, or the approximate amount of greenhouse gas emissions likely to result from the fuel transaction at hand, and the corresponding amount of credits the customer would need to purchase to offset the immediate emission footprint. Additionally, the customer may be prompted to disclose information regarding his/her usage of fuel. The disclosed information may then be used to further assist the customer, such as in providing the customer information about specific types of emissions or in calculating an emission footprint over a greater time span (e.g., an annual emission footprint). Other ways of assisting the customer include providing general information on greenhouse gas emissions, giving descriptions of offset projects, and providing statistics on the amount credits purchased. After receiving such assistance, the customer may feel further encouraged to purchase credits, or be better able to determine a desired amount of credits to purchase. The prompting for information may occur prior to or after the customer's initial response to the offer.

Figure 2A:
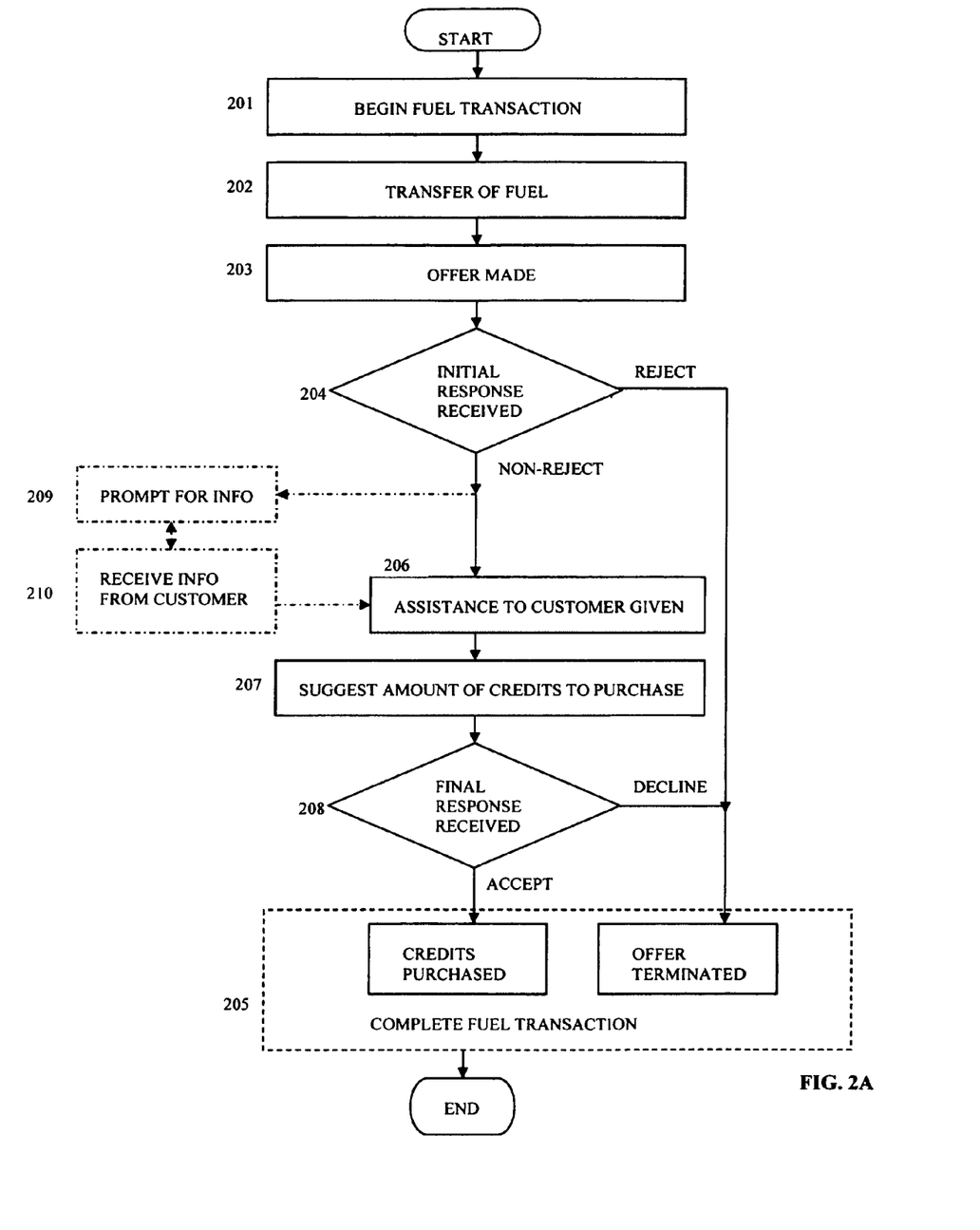
FIGS. 2A and 2B contain flow diagrams illustrating the steps of selling emission reduction credits at a fuel dispenser after or before the transfer of fuel, respectively, including the additional steps of prompting the customer for information and/or assisting the customer.

FIG. 2A is a flow diagram illustrating the steps of selling emission reduction credits at a fuel dispenser after the transfer of fuel, including the additional steps of prompting the customer for information and/or assisting the customer. In step 201, the fuel transaction with the customer is begun. In step 202, the fuel is transferred to the customer. In step 203, an offer to purchase emission reduction credits is made to the customer. In step 204, an initial response to the offer is received from the customer. If the customer's response comprises a rejection of the offer, then step 205 of completing the fuel transaction may further comprise terminating the offer to sell emission reduction credits. If the customer's response comprises a non-rejection of the offer (i.e., acceptance, indication of undecidedness, etc.), in step 206 assistance is given to the customer at the fuel dispenser. In one embodiment, the assistance given to the customer does not require additional prompting. Rather, it involves reading the amount of fuel transferred in the transaction at hand, using it to calculate the customer's immediate emission footprint, and informing the customer of this footprint. In step 207, the customer is given a suggested amount of credits to purchase. This amount may be based on the customer's immediate footprint or it may be some other amount. In step 208, the customer then communicates a final response to the offer, either by accepting the offer and indicating a desired amount of credits to purchase, or declining the offer. If the customer's response comprises an acceptance of the offer, then step 205 of completing the transaction further comprises effectuating the customer's purchase of the desired amount of credits. On the other hand, if the customer's response comprises a rejection of the offer, then step 205 of completing the transaction may further comprise terminating the offer to sell emission reduction credits.

As described earlier, in other embodiments, the customer may be prompted during the transaction to disclose information regarding the customer's use of fuel, as illustrated in optional step 209 in FIG. 2A. In optional step 210, the customer discloses information in response to the prompt. Steps 209 and 210 may be repeated as is necessary or desired. After the last repetition, assistance is given to the customer in step 206. From the information gathered by the prompting, the customer's annual emission footprint, or a footprint over some other time span, may be calculated, and the customer may be informed of it along with his/her immediate emission footprint. In step 207, the customer is given a suggested amount of credits to purchase. This amount may be based on the customer's immediate footprint and/or annual footprint, or it may be some other amount. The customer then proceeds to make a final response to the offer in step 208.

Figure 3A:
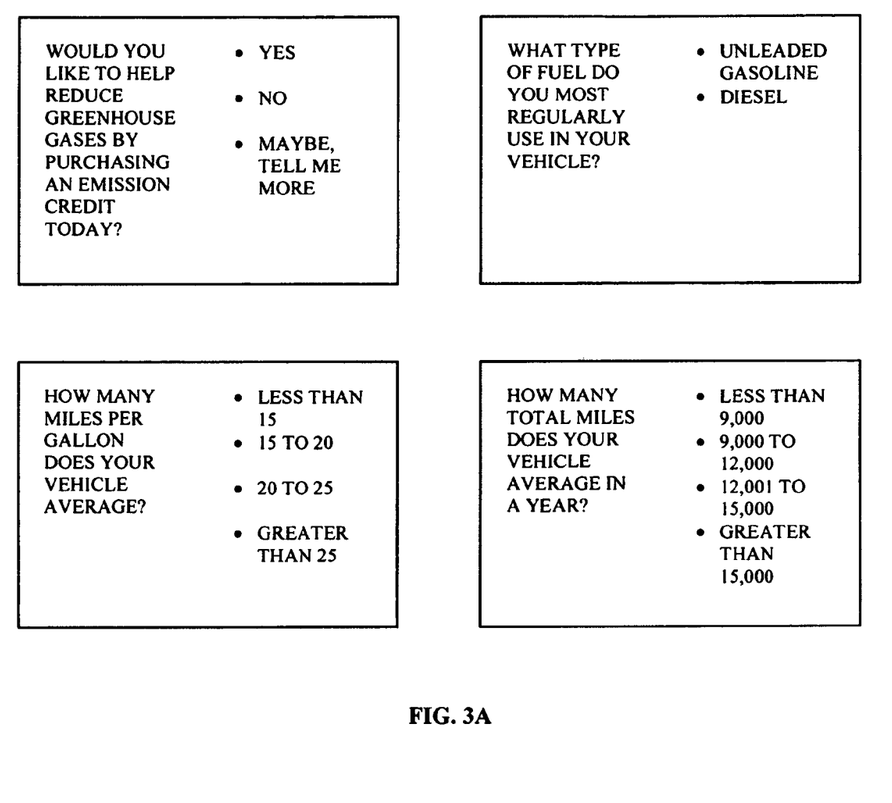
FIGS. 3A and 3B illustrate examples of various prompts that may be displayed on a user interface at a fuel dispenser during the steps of prompting for information and assisting the customer.
Figure 3B:
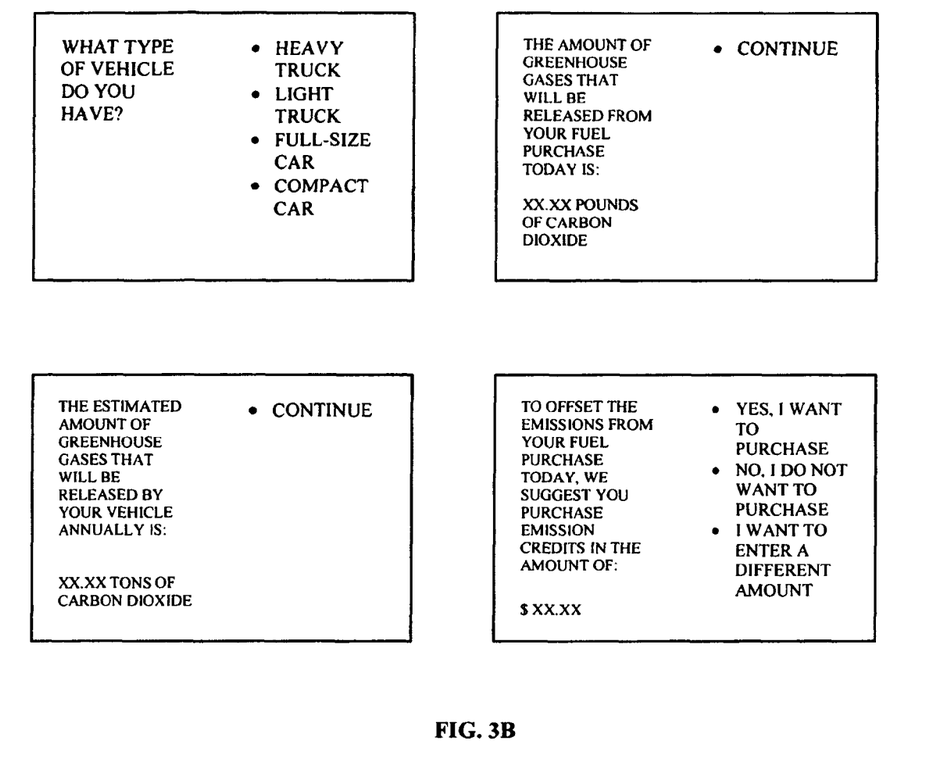

The information that the customer is prompted to disclose may include the type of fuel used, the type of use for the fuel, the type of machine in which the fuel is used, or any combination thereof. FIGS. 3A and 3B illustrate examples of various prompts that may be displayed on a user interface at a fuel dispenser during the steps of prompting for information and assisting the customer. In an automobile fuel transaction, the information gathered from the prompting may be used to calculate and display the customer's estimated annual emission footprint. For example, the customer may be prompted to disclose the type of fuel the customer regularly uses in his/her vehicle, such as unleaded gasoline or diesel fuel. For the type of use for the fuel, the customer may be prompted to disclose the typical distance that the customer drives in a year. Additionally or alternatively, for the type of machine in which the fuel is used, the customer may be prompted to disclose information about the size and/or type of vehicle the customer drives, either generally—such as truck, full-size, midsize, or compact—or specifically—such as the make, model, and year. Other information that may be disclosed include the intended driving routes, average speeds, type of engine, fuel efficiency, and/or anything else that may be useful in determining, calculating, or displaying an emission footprint. It is not required that the customer be prompted for all of the information. Some of the information needed to calculate an emission footprint can be inferred. For example, the type of fuel used by the customer over the course of a year, or other time period, can be inferred by reading the type of fuel transferred into the automobile during the transaction at hand.

Several methodologies for calculating emission footprints exist today. One such methodology is described the U.S. Environmental Protection Agency's fact sheet entitled *Greenhouse Gas Emissions from a Typical Passenger Vehicle*, dated February 2005. Another example is described the U.K. Department for Environment, Food and Rural Affairs's *Act on $CO_2$ Calculator: Data, Methodology, and Assumptions Paper* version 1.2, dated August 2008. Methodologies may rely on emissions statistics such as those provided by the Environmental Protection Agency, named factors for greenhouse gas emissions such as those provided by the Energy Information Administration, statistics on fuel economy such as those provided by the U.S. Department of Energy, and/or other information. In the invention, the customer's immediate emission footprint may be calculated using information gathered solely from the fuel transaction at hand. Different types of fuel emit different levels of greenhouse gases. For example, in an automobile fuel transaction, knowledge of (1) the type of fuel transferred (e.g., gasoline, diesel, biodiesel, ethanol, etc.) and (2) the quantity of fuel transferred is sufficient to yield an estimated calculation of the quantity of $CO_2$ that will be emitted by the fuel from that transaction, or the immediate footprint. The customer's annual (or other) emission footprint may be calculated from information gathered from the fuel transaction at hand supplemented with information disclosed by the customer about his/her use of fuel in response to the prompting. The various footprints may be calculated with existing or newly developed methodologies and communicated to the customer. Providing emission footprints to the customer is one way of assisting the customer.

Figure 2B:
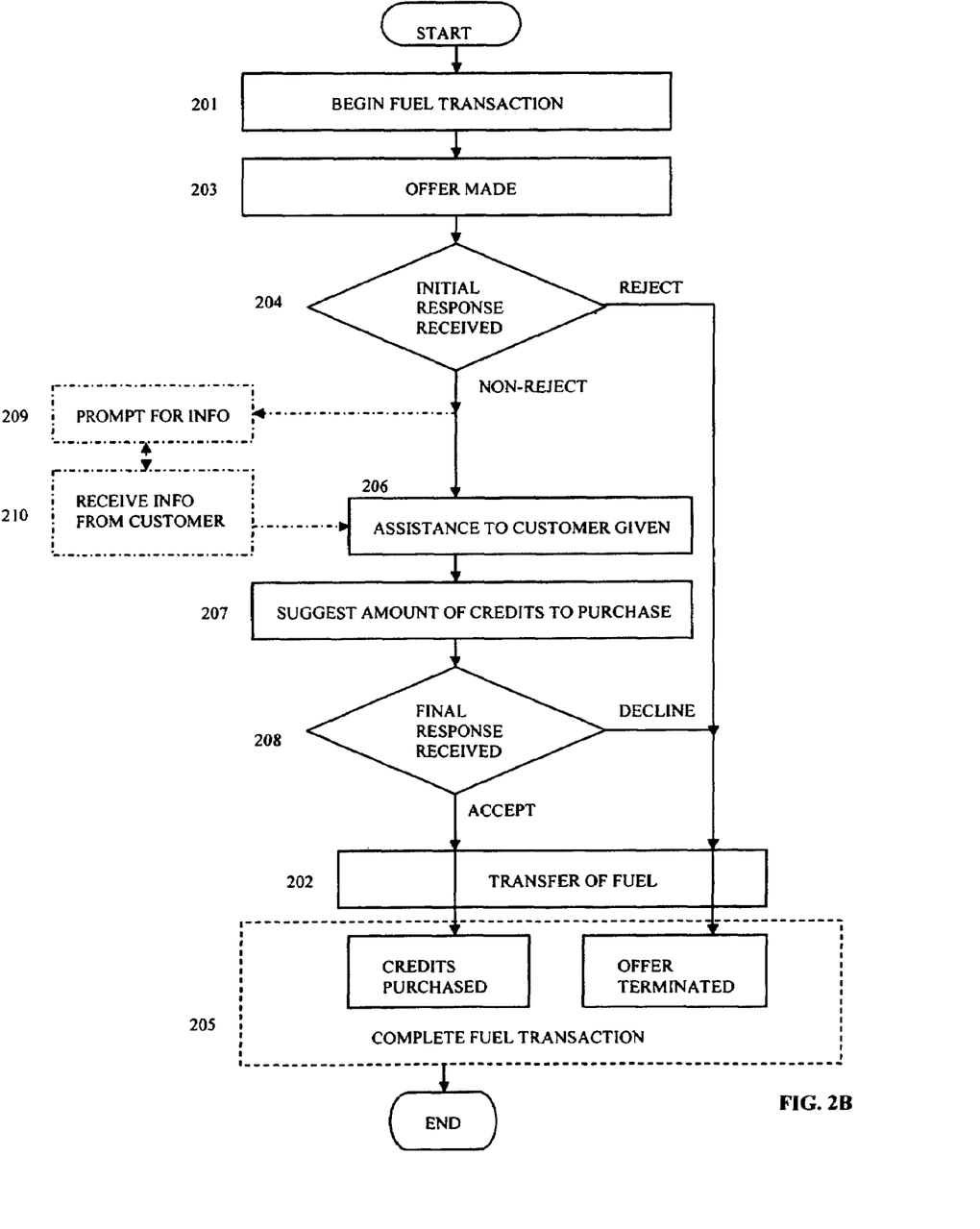

FIG. 2B depicts a variation of the flow diagram in FIG. 2A, except in FIG. 2B, the steps of the offer being made, assistance being given, and responses being received occur before step 202 of the transfer of fuel, rather than after. A possible implementation of this embodiment may be to display an offer to the customer to purchase a fixed amount of credits, such as one U.S. dollar's worth of credits, before the fuel transfer starts. The customer may receive assistance such as general information on greenhouse gas emissions, for example, and give his/her final acceptance or rejection of the offer before the fuel is transferred. In this embodiment, since the assistance is given before the transfer of fuel occurs, it would be more difficult to offer the type of assistance that requires calculating and displaying the customer's immediate emission footprint. While not illustrated, a myriad of other embodiments are possible by varying the timing of giving assistance to the customer, prompting for information, or other steps.

Figure 4:
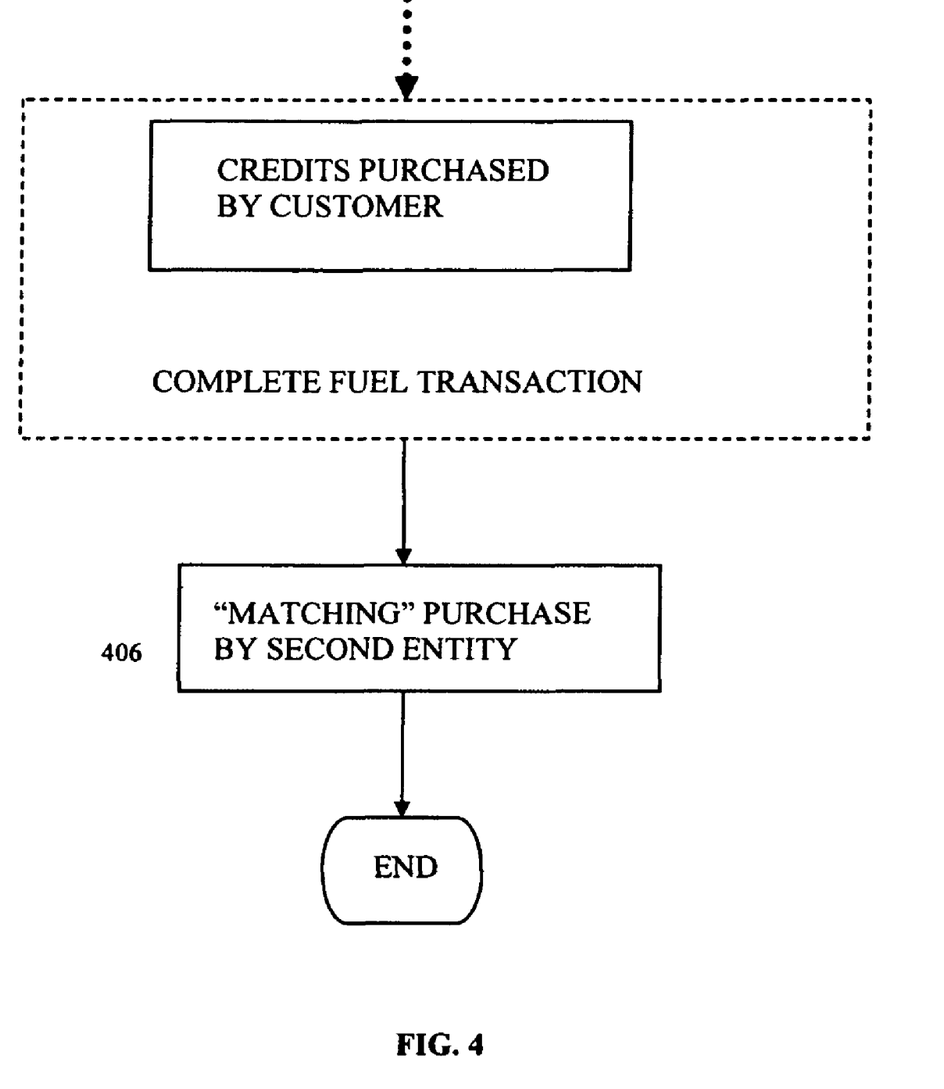
FIG. 4 is a flow diagram illustrating an embodiment in which a second "matching" purchase by an entity is effectuated by a customer's purchase of emission reduction credits.

In another embodiment, when the purchase of credits by a customer at a fuel dispenser is effectuated, the invention provides for the purchase of a second amount of emission reduction credits concurrent or subsequent to the credits being purchased by the customer. This second purchase may be made by any entity, which may include the owner of the fuel dispenser, the operator of the fuel dispenser, the issuer of a credit card used to purchase the fuel and/or emission reduction credit, or even the entity that originally provided or was involved with providing the fuel to said owner or operator, such as an oil company or oil services company. The customer may be more inclined to buy the credits knowing that the purchase will have an additional positive environmental impact due to the other entity's "matching" purchase—even though the amount of such matching purchase may be less than or greater than the amount of credits purchased by the customer. The "matching" purchase may be a fraction or multiple of the amount of credits purchased by the customer, but need not be limited to such an amount. FIG. 4 is a flow diagram illustrating the second "matching" purchase being effectuated by the customer's purchase of credits. Step 405 illustrates the step of completing the fuel transaction, including the purchase of credits by the customer. As a result, in step 406, a "matching" purchase of credits is immediately or subsequently made by a second entity. In one embodiment of the invention, the "matching" purchase is only made if the customer uses a credit card associated with the second entity during the fuel transaction, thereby providing an incentive for the customer to use the entity's credit card as well as an incentive for the entity to purchase credits. For example, a credit card company may choose to make a "matching" purchase if a customer owning a credit card issued by the company uses the card to purchase fuel and/or emission reduction credits. In another example, an entity might make prepaid cards available for purchase by customers where the prepaid card can be used solely to purchase emission reduction credits.

While the invention is capable of being implemented in a variety of ways and specific apparatuses, it may be implemented advantageously into existing pay-at-the-pump systems, such as those in gas stations. Specifically, it may be implemented by adding prompts directed to the method of selling emission reduction credits described above to a user interface already existing on a pay-at-the-pump system. For example, one may use the technology that is currently available for buying a car wash at the pump to buy credits. Thus, a conventional pay-at-the-pump gas dispenser may often comprise a device for receiving a payment from a customer, a device for delivering gas, and a user interface. The instant invention may be implemented by configuring and programming the user interface on the pump along with the applicable control systems so that credits may be offered for sale to customers.

Figure 5A:
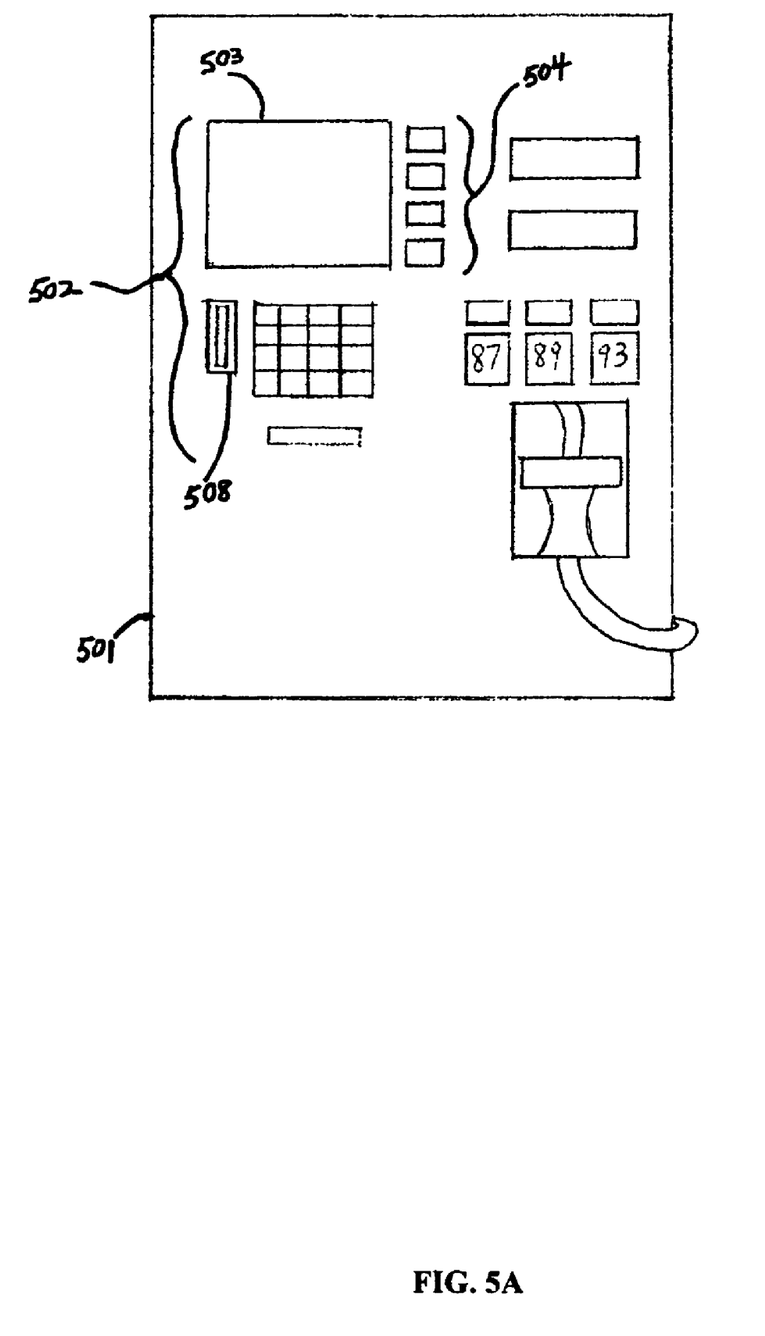
FIGS. 5A and 5B illustrate one embodiment of an apparatus capable of selling emission reduction credits at a fuel dispenser.
Figure 5B:
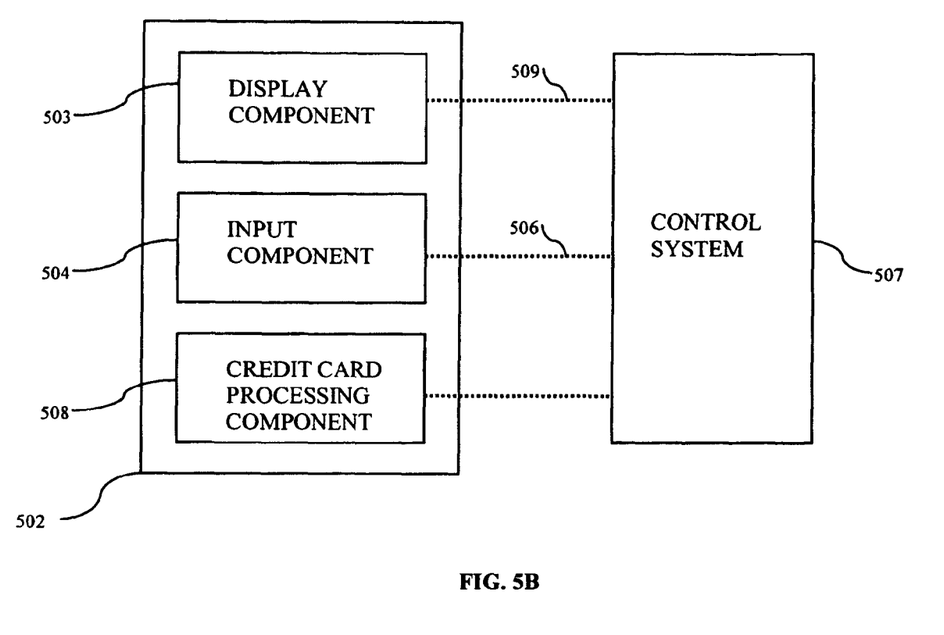

FIGS. 5A and 5B illustrate one embodiment of an apparatus capable of selling emission reduction credits at a fuel dispenser. The apparatus comprises a fuel dispenser, such as fuel pump at a gas station in this instance. The fuel pump 501 comprises a user interface 502 capable of (a) displaying an offer to purchase emission reduction credits on a display component 503; (b) receiving a response from a customer via an input component 504; and (c) transmitting the response in the form of a communication signal 506. The user interface 502 may further be capable of one or more of the following: prompting the customer via the display component 503 to disclose information about the customer's use of fuel via the input component 504; assisting the customer in determining a desired amount of credits to purchase via the display component 503; displaying the amount of credits purchased by the customer via the display component 503; and displaying on the display component 503 a second amount of credits purchased by an entity wherein the second amount constitutes a "matching" purchase to credits purchased by the customer.

The communication signal 506 may be transmitted to a control system 507 in any convenient manner including, for example, via a wired or wireless network. The control system 507 may be located anywhere so long as it is operably connected to the fuel pump 501 such that it is capable of receiving the communication signal 506 and ultimately either effectuating a purchase of credits based on the communication signal 506 received, or terminating the offer to purchase credits. In one embodiment, a series of communication signals 506, 509 are transmitted and received between the display component 503 and control system 507 and between the input component 504 and control system 507. These communications signals enable one or more of the following functions of the apparatus: (a) displaying the offer to the customer, (b) receiving the customer's initial response, (c) prompting the customer to disclose information about his/her use of fuel, (d) receiving the customer's disclosed information, (e) calculating and displaying to the customer an immediate emission footprint correlating to the fuel transferred in the transaction at hand, (f) calculating and displaying to the customer an estimated annual (or other) emission footprint based on the disclosed information from the customer, (e) assisting the customer in determining a suggested amount of credits to purchase, (f) receiving the customer's final response to the offer, (g) effectuating the purchase of the credits or terminating the offer, (h) effectuating the recording of the amount of credits purchased, if applicable, and (i) effectuating the generation of a receipt. The control system 507 may be at the same location as the fuel pump 501, such as at the gas station in this specific example, or at some remote location. In another embodiment, the control system may be located within the fuel dispenser itself. Software may be included in the control system 507, in the user interface 502, or both to assist the apparatus in effectuating the purchase of credits, calculating emission footprints, calculating a suggested amount of credits for the customer to purchase, calculating the amount of a "matching" purchase to be made by an entity, notifying the entity of the customer's purchase, recording the amounts of any purchases, processing a credit card, and any other related functions. Similarly, the fuel pump 501 may further comprise a credit card processing component 508 for receiving, reading, and/or processing a customer's credit card. In such cases the credit card processing component 508 may be operably linked to the control system 507 and/or any software located in the control system 507. In a "matching" purchase scenario, when a credit card associated with an entity is used in the fuel transaction, the control system 507 may notify the entity so that the entity may make a purchase of credits.

Although only exemplary embodiments are specifically illustrated and described herein, it will be appreciated that many modifications and variations of the apparatus and method described herein are possible in light of the above teachings and within the purview of the appended claims without departing from the spirit and intended scope of the claimed subject matter.

What is claimed is:

1. An apparatus for selling greenhouse gas emission reduction credits, comprising:
   (a) a fuel dispenser comprising a user interface configured to
      (i) display an offer to purchase emission reduction credits to a customer;
      (ii) receive the customer's response; and
      (iii) transmit the response in the form of a communication signal; and
   (b) a control system operably connected to the fuel dispenser such that the control system is configured to receive the communication signal and, based on the customer's response, effectuate at least one of: the purchase of emission reduction credits or terminating the offer;
   wherein the control system is further configured to:
   calculate an amount of greenhouse gas emissions corresponding to the purchased amount of fuel transferred by the fuel dispenser;
   calculate a suggested amount of emission reduction credits corresponding to the amount of fuel transferred by the fuel dispenser; and
   transmit a second communication signal to the user interface, which displays the calculated suggested amount of emission reduction credits to purchase.

2. The apparatus of claim 1 wherein the user interface is further configured to prompt the customer to disclose information regarding the use of fuel.

3. The apparatus of claim 1 wherein the user interface is further configured to display a second amount of emission reduction credits purchased by an entity upon a purchase of emission reduction credits by the customer.

4. The apparatus of claim 1 wherein the fuel dispenser further comprises a credit card processing component which is operably linked to the control system.

5. The apparatus of claim 1 wherein the control system is configured to effectuate the recording of an amount of emission reduction credits purchased.

6. The apparatus of claim 1 wherein the control system is configured to effectuate the generation of a receipt.

7. The apparatus of claim 1 wherein the communication signal is a wireless communication signal.

8. A method of reducing greenhouse gas emissions during a consumer transaction for the transfer of fuel comprising:
   (a) offering, by a control system, to sell emission reduction credits to a customer at a fuel dispenser;
   (b) receiving, by the control system, the customer's response at the fuel dispenser; and
   (c) completing, by the control system, the transaction based on the transmitted response including recording the amount of credits purchased;
   wherein the control system is further configured to:
   calculate an amount of greenhouse gas emissions corresponding to the purchased amount of fuel transferred by the fuel dispenser;
   calculate a suggested amount of emission reduction credits corresponding to the amount of fuel transferred by the fuel dispenser; and
   transmit the calculated suggested amount of emission reduction credits to purchase to the user interface for displaying to the user.

9. The method of claim 8 wherein:
   (a) the customer's response comprises an acceptance of the offer; and
   (b) completion of the transaction comprises effectuating the customer's purchase of emission reduction credits.

10. The method of claim 9 wherein:
    (a) the customer's response further comprises the suggested amount of emission reduction credits; and
    (b) completion of the transaction further comprises effectuating the customer's purchase of the suggested amount of emission reduction credits.

11. The method of claim 9 wherein the completion of the transaction further comprises effectuating an entity to purchase a second amount of emission reduction credits subsequent to the customer's purchase.

12. The method of claim 9 wherein the completion of the transaction further comprises effectuating an entity to purchase a second amount of emission reduction credits subsequent to the customer's purchase, wherein the transaction is conducted by using a credit card associated with the entity.

13. The method of claim 8 which further comprises prompting, by the control system, the customer to disclose information regarding the use of fuel.

14. The method of claim 13 wherein the prompted information is selected from the group consisting of the type of fuel used, the type of use for the fuel, the type of machine in which the fuel is used, or any combination thereof.

15. The method of claim 8 wherein the fuel dispenser is a fuel pump.

16. An apparatus for selling greenhouse gas emission reduction credits, comprising:
    (a) a fuel dispenser comprising a user interface configured to
       (i) display an offer to purchase emission reduction credits to a customer;
       (ii) receive the customer's response; and
       (iii) transmit the response in the form of a communication signal; and
    (b) a control system operably connected to the fuel dispenser such that the control system is configured to receive the communication signal and, based on the customer's response, effectuate at least one of the purchase of emission reduction credits or terminating the offer;
    wherein the user interface is further configured to:
    prompt the customer to disclose information regarding the fuel;
    calculate an amount of greenhouse gas emissions corresponding to the amount of fuel purchased by the customer at the fuel dispenser;
    calculate a suggested amount of emission reduction credits corresponding to the amount of fuel purchased by the customer; and
    display the suggested amount of emission reduction credits to the customer to purchase,
    wherein said suggested amount is based on the calculated amount of greenhouse gas emissions associated with the amount of fuel purchased by the customer at the fuel dispenser.

17. The method of claim 16 wherein the prompted information is selected from the group consisting of the type of fuel used, the type of use for the fuel, the type of machine in which the fuel is used, or any combination thereof.

* * * * *